US008340969B2

(12) United States Patent
Malo et al.

(10) Patent No.: US 8,340,969 B2
(45) Date of Patent: Dec. 25, 2012

(54) METHOD AND MOBILE COMMUNICATION DEVICE FOR GENERATING DUAL-TONE MULTI-FREQUENCY (DTMF) COMMANDS ON A MOBILE COMMUNICATION DEVICE HAVING A TOUCHSCREEN

(75) Inventors: Eric G. Malo, Waterloo (CA); Lawrence Edward Kuhl, Waterloo (CA)

(73) Assignee: Research In Motion Limited, Waterloo (CA)

(*) Notice: Subject to any disclaimer, the term of this patent is extended or adjusted under 35 U.S.C. 154(b) by 886 days.

(21) Appl. No.: 12/429,665

(22) Filed: Apr. 24, 2009

(65) Prior Publication Data
US 2010/0274563 A1 Oct. 28, 2010

(51) Int. Cl.
*G10L 11/00* (2006.01)
*H04M 1/64* (2006.01)
*G06F 3/16* (2006.01)

(52) U.S. Cl. .............. 704/270; 379/88.01; 715/727
(58) Field of Classification Search .................. None
See application file for complete search history.

(56) References Cited

U.S. PATENT DOCUMENTS

| | | | |
|---|---|---|---|
| 5,724,420 A | 3/1998 | Torgrim | |
| 5,850,429 A * | 12/1998 | Joyce et al. | 379/88.1 |
| 6,091,805 A * | 7/2000 | Watson | 379/93.17 |
| 6,173,042 B1 * | 1/2001 | Wu | 379/88.04 |
| 6,418,211 B1 | 7/2002 | Irvin | |
| 6,493,428 B1 * | 12/2002 | Hillier | 379/67.1 |
| 6,504,917 B1 * | 1/2003 | Flint et al. | 379/93.01 |
| 6,885,737 B1 * | 4/2005 | Gao et al. | 379/93.17 |
| 6,920,425 B1 * | 7/2005 | Will et al. | 704/275 |
| 7,027,990 B2 * | 4/2006 | Sussman | 704/270.1 |
| 7,092,738 B2 * | 8/2006 | Creamer et al. | 455/563 |
| 7,136,478 B1 * | 11/2006 | Brand et al. | 379/265.09 |
| 7,215,743 B2 * | 5/2007 | Creamer et al. | 379/88.18 |
| 7,479,949 B2 * | 1/2009 | Jobs et al. | 345/173 |
| 7,614,008 B2 * | 11/2009 | Ording | 715/773 |
| 7,633,076 B2 * | 12/2009 | Huppi et al. | 250/559.36 |
| 7,694,231 B2 * | 4/2010 | Kocienda et al. | 715/773 |
| 7,715,531 B1 * | 5/2010 | Golding et al. | 379/88.18 |
| 7,813,485 B2 * | 10/2010 | Yin et al. | 379/88.13 |

(Continued)

OTHER PUBLICATIONS

Chip Mulligan, Nuance brings voice recognition to mobile phones, Feb. 2, 2007, http://www.theinquirer.net/inquirer/news/931/1001931/nuance-brings-voice-recognition-to-mobile-phones.

(Continued)

*Primary Examiner* — Brian Albertalli
(74) *Attorney, Agent, or Firm* — Ridout & Maybee LLP (57) ABSTRACT

A method and mobile communication device for generating dual-tone multi-frequency (DTMF) commands on a mobile communication device having a touchscreen are provided. In accordance with one embodiment, there is provided a method for generating dual-tone multi-frequency (DTMF) commands on a mobile communication device having a touchscreen, comprising: detecting an automated attendant during a telephone call; activating speech recognition in respect of incoming voice data during the telephone call in response to detecting an automated attendant; translating spoken prompts in the incoming voice data into respective DTMF commands; displaying a menu having selectable menu options corresponding to the DTMF commands In a graphical user interface on the touchscreen; receiving input selecting one of the menu options; receiving input via the touchscreen activating a selected one of the menu options; and generating a DTMF command in accordance with the activated menu option.

23 Claims, 6 Drawing Sheets

U.S. PATENT DOCUMENTS

| | | | |
|---|---|---|---|
| 7,952,566 B2* | 5/2011 | Poupyrev et al. | 345/173 |
| 8,050,928 B2* | 11/2011 | George et al. | 704/270 |
| 2004/0122941 A1 | 6/2004 | Creamer et al. | |
| 2005/0048992 A1* | 3/2005 | Wu et al. | 455/466 |
| 2006/0026521 A1* | 2/2006 | Hotelling et al. | 715/702 |
| 2007/0119698 A1* | 5/2007 | Day | 200/510 |
| 2008/0039056 A1* | 2/2008 | Mathews et al. | 455/414.1 |
| 2008/0169944 A1* | 7/2008 | Howarth et al. | 341/23 |
| 2008/0304639 A1 | 12/2008 | McDonough et al. | |
| 2009/0154666 A1* | 6/2009 | Rios et al. | 379/88.18 |
| 2010/0057456 A1* | 3/2010 | Grigsby et al. | 704/235 |
| 2010/0208873 A1* | 8/2010 | Chambers | 379/52 |
| 2012/0008755 A1* | 1/2012 | Mittal | 379/93.01 |

OTHER PUBLICATIONS

Active Voice and ScanSoft to Deliver New Speech-Enabled Automated Attendant System, Jun. 7, 2005, http://www.necus.com/companies/23/ACTIVEVOICE_ScanSoftDeliverNewAttendantSystem.pdf.

* cited by examiner

METHOD AND MOBILE COMMUNICATION DEVICE FOR GENERATING DUAL-TONE MULTI-FREQUENCY (DTMF) COMMANDS ON A MOBILE COMMUNICATION DEVICE HAVING A TOUCHSCREEN

TECHNICAL FIELD

The present disclosure relates generally to input mechanism, and in particular to a method and mobile communication device for generating dual-tone multi-frequency (DTMF) commands on a mobile communication device having a touchscreen.

BACKGROUND

Automated attendants (also referred to as merely auto attendants or auto-attendants) allow callers to obtain information via recorded messages or to be transferred to an extension without the intervention of an operator. Typically, automated attendants provide a menu system in which users are informed about the available menu options via recorded messages and which allow users to make selections via corresponding input via the numeric keypad of their wired or wireless telephone. For example, "for English, press 1,for French, press 2", etc. The depression of numeric keys in the keypad generates dual-tone multi-frequency (DTMF) commands. Selections via the numeric keypad generate DTMF tones which are interpreted by a DTMF decoder of the automated attendant system.

There is no standard format for automated attendant menu systems. Accordingly, unless users are familiar with a particular automated attendant menu system, users are required to listen to various recorded messages to determine the menu options, and then make their selection. However, mobile communication devices having a touchscreen typically do not have a fixed numeric keypad nor is a virtual numeric keypad displayed on the touchscreen during a telephone call. When interacting with automated attendant systems, device users have to lower the device from their ear to view the touchscreen display and navigate through onscreen menus to invoke the numeric keypad and display it on the touchscreen display. By the time the device user has invoked the numeric keypad on the touchscreen display, one or more menu options could have been announced already. If so, the user must play the menu options again. Even after the numeric keypad is displayed on the touchscreen display, selecting a menu option requires device users to again lower the device from their ear to view the touchscreen display and make the appropriate selection and/or activation input.

In view of the above, there remains a need for an improved method and mobile communication device for generating DTMF commands on a mobile communication device having a touchscreen.

BRIEF DESCRIPTION OF THE DRAWINGS

Like reference numerals are used in the drawings to denote like elements and features.

DETAILED DESCRIPTION OF EXAMPLE EMBODIMENTS

The present disclosure provides a method and mobile communication device for generating dual-tone multi-frequency (DTMF) commands on a mobile communication device having a touchscreen. In some embodiments, when an automated attendant is detected, speech recognition is activated and spoken prompts/menu options of the automated attendant are translated into DTMF commands and possibly other information. A menu having menu options which correspond to the spoken prompts/menu options of the automated attendant is rendered and displayed in the GUI of the device. Selection and/or activation of a menu option in the GUI menu generates the respective DTMF command associated with that menu option. An automated attendant may be detected automatically using voice recognition or may be detected by device users who activate speech recognition via respective input using one of the input devices of the device.

In other embodiments, rather than translating spoken prompts/menu options into menu options displayed in the GUI, the menu structure of the automated attendant system is obtained via a separate data connection to the automated attendant system or other data store where automated attendant menu structures are stored.

In yet other embodiments, no GUI element is provided. Instead, speech recognition is used to determine the DTMF commands associated with spoken prompts/menu options without rendering or displaying a GUI menu. Touch input anywhere on a touch-sensitive overlay of the touchscreen or depression of the touchscreen causes the DTMF command of the currently spoken prompt/menu option to be generated.

In accordance with one embodiment of the present disclosure, there is provided a method for generating dual-tone multi-frequency (DTMF) commands on a mobile communication device having a touchscreen, comprising: detecting an automated attendant during a telephone call; activating speech recognition in respect of incoming voice data during the telephone call in response to detecting an automated attendant; translating spoken prompts in the incoming voice data into respective DTMF commands; displaying a menu having selectable menu options corresponding to the DTMF commands in a graphical user interface on the touchscreen; receiving input selecting one of the menu options; receiving input via the touchscreen activating a selected one of the menu options; and generating a DTMF command in accordance with the activated menu option.

In accordance with another embodiment of the present disclosure, there is provided a method for generating dual-tone multi-frequency (DTMF) commands on a mobile communication device having a touchscreen, comprising: detecting an automated attendant during a telephone call; requesting and receiving DTMF commands in respect of the automated attendant in response to detecting an automated attendant; displaying a menu having selectable menu options corresponding to the DTMF commands In a graphical user interface on the touchscreen; receiving input selecting one of the menu options; receiving input via the touchscreen activating a selected one of the menu options; and generating a DTMF command in accordance with the activated menu option.

In accordance with a further embodiment of the present disclosure, there is provided a method for generating dual-tone multi-frequency (DTMF) commands on a mobile communication device having a touchscreen, comprising: detecting an automated attendant during a telephone call; activating speech recognition in respect of incoming voice data during the telephone call in response to detecting an automated attendant; translating spoken prompts in the incoming voice data into respective DTMF commands; receiving input via the touchscreen during reproduction of one of the spoken prompts; and generating a DTMF command in accordance with a spoken prompt being reproduced when the input is received via the touchscreen.

In accordance with a further embodiment of the present disclosure, there is provided a handheld mobile communication device, comprising: a case housing the components of the device; a controller; an audio output device connected to the controller comprising one or more of a speaker or an audio output port; a wireless communication subsystem connected to the controller configured for at least voice communication with a wireless network; a touchscreen display having a touch-sensitive overlay connected to the controller; wherein the controller is configured for performing the method(s) set forth herein.

In accordance with yet a further embodiment of the present disclosure, there is provided a computer program product comprising a computer readable medium having stored thereon computer program instructions for implementing a method on a handheld electronic device for controlling its operation, the computer executable instructions comprising instructions for performing the method(s) set forth herein.

Mobile Communication Device

Figure 1:
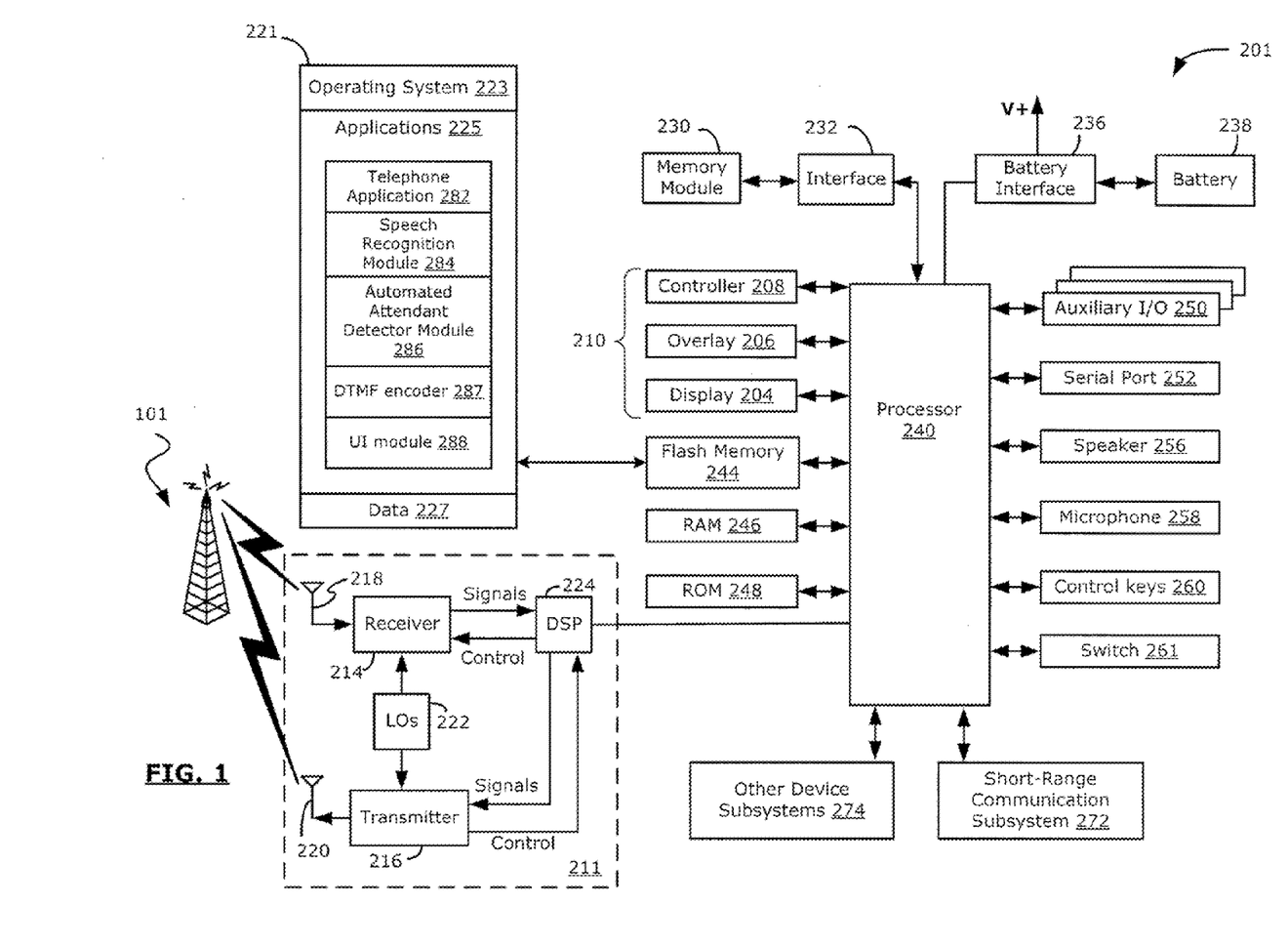
FIG. 1 is a block diagram illustrating a mobile communication device in accordance with one example embodiment of the present disclosure.

Reference is now made to FIG. 1 which illustrates a mobile communication device 201 In which example embodiments described in the present disclosure can be applied. The mobile communication device 201 is a two-way communication device having at least voice and possibly also data communication capabilities, and the capability to communicate with other computer systems, for example, via the Internet. Depending on the functionality provided by the mobile communication device 201, in various embodiments the device may be a multiple-mode communication device configured for both data and voice communication, a smartphone, a mobile telephone or a PDA (personal digital assistant) enabled for wireless communication, or a computer system with a wireless modem.

The mobile communication device 201 includes a controller comprising at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems including a display screen 204, such as a liquid crystal display (LCD) screen, with a touch-sensitive overlay or input surface 206 connected to an electronic controller 208 that together make up a touchscreen display 210. The touch-sensitive input surface 206 and the electronic controller 208 provide a touch-sensitive input device and the processor 240 interacts with the touch-sensitive input surface 206 via the electronic controller 208. The device 201 could include other input devices such as a keyboard or keypad, navigational tool (input device), or both. The navigational tool could be a clickable/depressible trackball or scrollwheel. The other input devices could be included in addition to, or instead of, the touchscreen display 210.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272 and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which mobile communication device 201 is intended to operate.

The mobile communication device 201 may communicate with any one of a plurality of fixed transceiver base stations 108 (FIG. 8) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 1, the software modules 221 comprise operating system software 223, software applications 225 comprising a telephone application 282 for telephony functions, a speech recognition module 284 for converting speech into text and/or other input, an automated attendant detector module 286 for detecting an automated attendant during a telephone call, a DTMF encoder 287, and a user interface module 288. The user interface (UI) module 288 renders and displays a graphical user interface (GUI) on a display 204 of the device 201 in accordance with instructions of the operating system 223 and applications 225 (as applicable). The GUI allows interaction with and control over the operation of the device 201 may be displayed on the touchscreen display 210. The GUI is rendered prior to display by the operating system 223 or an application 225 which causes the processor 240 to display content on the touchscreen display 210. The DTMF encoder 287 interprets inputs on the device 201 and generates corresponding DTMF tones during telephone calls. The DTMF encoder 287 may be both a DTMF encoder and DTMF decoder in some embodiments.

The modules 282-288 may, among other things, each be implemented through standalone software applications, or combined together in a common application, the operating system 223 or other software application 225. The functions performed by each of the above identified modules 282-288 may be realized as a plurality of Independent elements, rather than a single integrated element, and any one or more of these elements may be implemented as parts of other software applications 225.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may include a range of applications, including, for example, an address book application, a messaging application, a calendar application, and/or a notepad application. Each of the software applications 225 may include layout information defining the placement of particular fields and graphic elements (e.g. text fields, input fields, icons, etc.) in the user interface (i.e. the display device 204) according to the application.

In some embodiments, the auxiliary I/O subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown).

In some embodiments, the mobile communication device 201 also includes a removable memory card 230 (typically comprising flash memory) and a memory card interface 232. Network access may be associated with a subscriber or user of the mobile communication device 201 via the memory card 230, which may be a Subscriber Identity Module (SIM) card for use In a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 227 in an erasable persistent memory, which in one example embodiment is the flash memory 244. In various embodiments, the data 227 includes service data comprising information required by the mobile communication device 201 to establish and maintain communication with the wireless network 101. The data 227 may also include user application data such as email messages, address book and contact information, calendar and schedule information, notepad documents, image files, and other commonly stored user information stored on the mobile communication device 201 by its user, and other data. The data 227 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 223 or software applications 225 may also be loaded onto the mobile communication device 201 through the wireless network 101, the auxiliary I/O subsystem 250, the serial port 252, the short-range communication subsystem 272, or other suitable subsystem 274 or other wireless communication interface. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 204. A user of the mobile communication device 201 may also compose data items, such as email messages, for example, using the touch-sensitive input surface 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a telephone call, or other telephone call related information.

Figure 2:
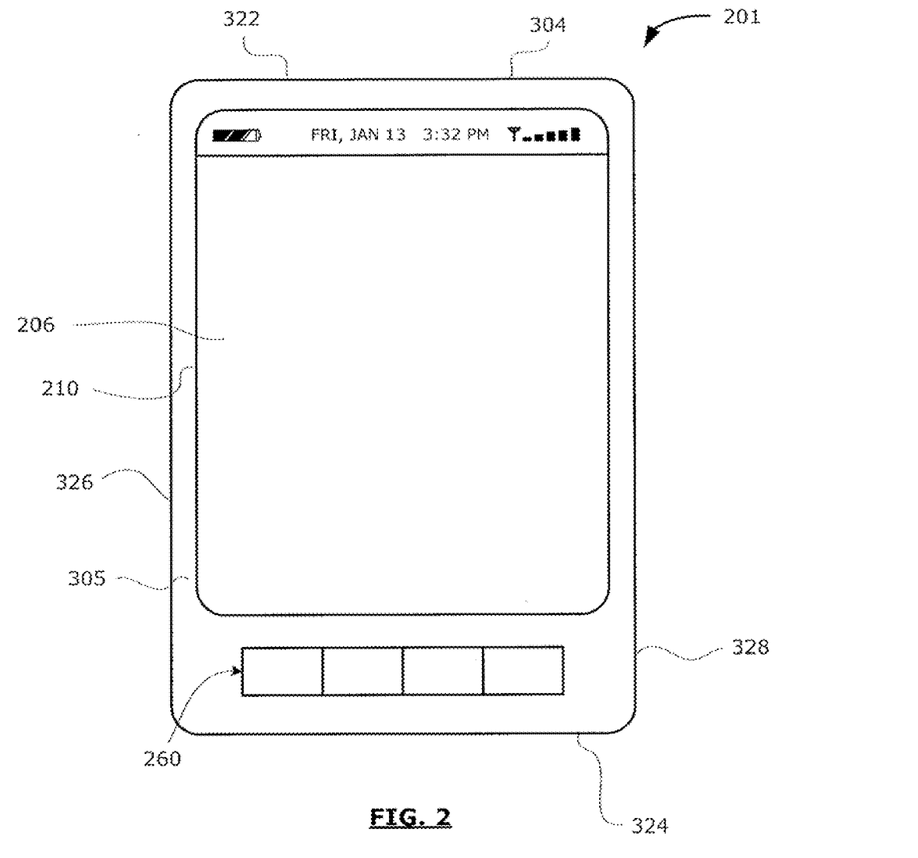
FIG. 2 is a front view of the mobile communication device of FIG. 1 in accordance with one example embodiment of the present disclosure.
Figure 3:
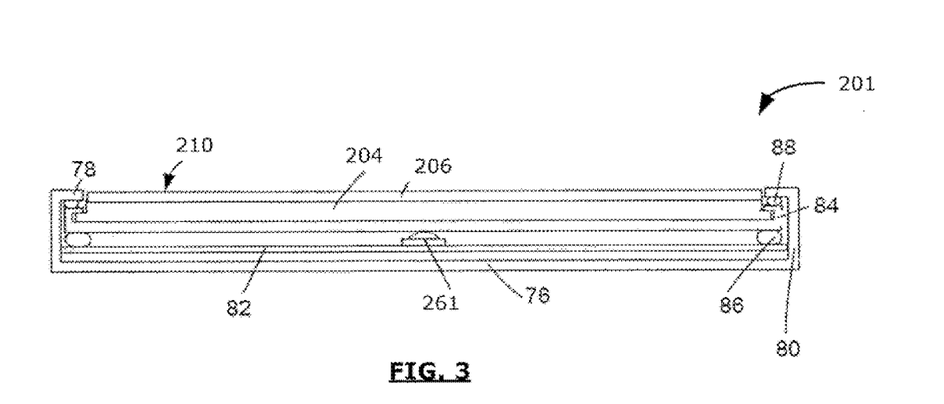
FIG. 3 is a simplified sectional view of the mobile communication device of FIG. 1 with the switch shown in a rest position.

Referring now to FIGS. 2 and 3, the construction of the device 201 will be described in more detail. The device 201 includes a rigid case 304 for housing the components of the device 201 that is configured to be held or cradle-able in a user's hand while the device 201 is in use. The touchscreen display 210 is mounted within a front face 305 of the case 304 so that the case 304 frames the touchscreen display 210 and exposes it for user-interaction therewith. The case 304 has opposed top and bottom ends designated by references 322, 324 respectively, and left and right sides designated by references 326, 328 respectively which extend transverse to the top and bottom ends 322, 324. In the shown embodiments of FIGS. 2 and 3, the case 304 (and device 201) is elongate having a length, defined between the top and bottom ends 322, 324, longer than a width, defined between the left and right sides 326, 328. Other device dimensions and form factors are also possible.

As further illustrated in FIG. 3, the case 304 includes a back 76, a frame 78 which frames the touch-sensitive display 210, sidewalls 80 that extend between and are generally perpendicular to the back 76 and the frame 78, and a base 82 that is spaced from and generally parallel to the back 76. The base 82 can be any suitable base and can include, for example, a printed circuit board or flex circuit board (not shown). The back 76 includes a plate (not shown) that is releasably attached for insertion and removal of, for example, the battery 238 and the memory module 230 described above. It will be appreciated that the back 76, the sidewalls 80 and the frame 78 can be injection molded, for example.

The display device 204 and the input surface 206 can be supported on a support tray 84 of suitable material such as magnesium for providing mechanical support to the display device 204 and input surface 206. The display device 204 and input surface 206 are biased away from the base 82, toward the frame 78 by biasing elements 86 such as gel pads between the support tray 84 and the base 82. Compliant spacers 88 which, for example, can also be in the form of gel pads are located between an upper portion of the support tray 84 and the frame 78. The touchscreen display 210 is movable within the case 304 as the touchscreen display 210 can be moved toward the base 82, thereby compressing the biasing elements 86. The touchscreen display 210 can also be pivoted within the case 304 with one side of the touchscreen display 210 moving toward the base 82, thereby compressing the biasing elements 86 on the same side of the touchscreen display 210 that moves toward the base 82.

In the example embodiment, the switch 261 is supported on one side of the base 82 which can be a printed circuit board while the opposing side provides mechanical support and electrical connection for other components (not shown) of the device 201. The switch 261 can be located between the base 82 and the support tray 84. The switch 261, which can be a mechanical dome-type switch (or in other example embodiments a plurality of mechanical dome-type switches), for example, can be located in any suitable position such that displacement of the touchscreen display 210 resulting from a user pressing the touchscreen display 210 with sufficient force to overcome the bias and to overcome the actuation force for the switch 261, depresses and actuates the switch 261. In the present example embodiment the switch 261 is in contact with the support tray 84. Thus, depression of the touchscreen display 210 by application of a force thereto, causes actuation of the switch 261, thereby providing the user with a positive tactile quality during user interaction with the user interface of the device 201. The switch 261 is not actuated in the rest position shown in FIG. 3, absent applied force by the user. It will be appreciated that the switch 261 can be actuated by pressing anywhere on the touchscreen display 210 to cause movement of the touchscreen display 210 in the form of movement parallel with the base 82 or pivoting of one side of the touchscreen display 210 toward the base 82. The switch 261 is connected to the processor 240 and can be used for further input to the processor when actuated. Although a single switch is shown any suitable number of switches can be used.

The touchscreen display 210 can be any suitable touchscreen display such as a capacitive touchscreen display. A capacitive touchscreen display 210 includes the display device 204 and the touch-sensitive input surface 206, in the form of a capacitive touch-sensitive input surface 206. It will be appreciated that the capacitive touch-sensitive input surface 206 includes a number of layers in a stack and is fixed to the display device 204 via a suitable optically clear adhesive. The layers can include, for example a substrate fixed to the display device 204 (e.g. LCD display) by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

Figure 4:
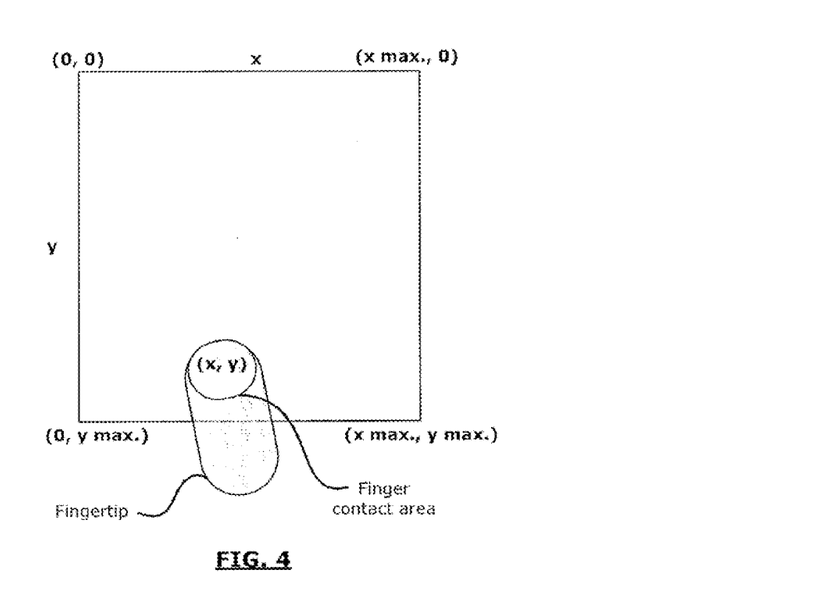
FIG. 4 illustrates a Cartesian dimensional coordinate system of a touchscreen which map locations of touch signals in accordance with one example embodiment of the present disclosure.

Referring now to FIG. 4 together with FIG. 1, each of the touch sensor layers comprises an electrode layer each having a number of spaced apart transparent electrodes. The electrodes may be a patterned vapour-deposited ITO layer or ITO elements. The electrodes may be, for example, arranged in an array of spaced apart rows and columns. As shown in FIG. 4, the touch sensor layers/electrode layers are each associated with a coordinate (e.g., x or y) in a coordinate system used to map locations on the touchscreen display 210, for example, in Cartesian coordinates (e.g., x and y-axis coordinates). The intersection of the rows and columns of the electrodes may represent pixel elements defined in terms of an (x, y) location value which can form the basis for the coordinate system. Each of the touch sensor layers provide a signal to the controller 208 (FIG. 1) which represent the respective x and y coordinates of the touchscreen display 210. That is, x locations are provided by a signal generated by one of the touch sensor layers and y locations are provided by a signal generated by the other of the touch sensor layers.

The electrodes in the touch sensor layers/electrode layers respond to changes in the electric field caused by conductive objects in the proximity of the electrodes. When a conductive object is near or contacts the touch-sensitive input surface 206, the object draws away some of the charge of the electrodes and reduces its capacitance. The controller 208 receives signals from the touch sensor layers of the touch-sensitive input surface 206, detects touch events by determining changes in capacitance which exceed a predetermined threshold, and determines the centroid of a contact area defined by electrodes having a change in capacitance which exceeds the predetermined threshold, typically in x, y (Cartesian) coordinates.

The controller 208 sends the centroid of the contact area to the processor 240 of the device 201 as the location of the touch event detected by the touchscreen display 210. Depending on the touch-sensitive input surface 206 and/or configuration of the touchscreen display 210, the change in capacitance which results from the presence of a conductive object near the touch-sensitive input surface 206 but not contacting the touch-sensitive input surface 206, may exceed the predetermined threshold in which case the corresponding electrode would be included in the contact area. The detection of the presence of a conductive object such as a user's finger or a conductive stylus is sometimes referred to as finger presence/stylus presence.

It will be appreciated that other attributes of a touch event on the touchscreen display 210 can be determined. For example, the size and the shape (or profile) of the touch event on the touchscreen display 210 can be determined in addition to the location based on the signals received at the controller 208 from the touch sensor layers. For example, the touchscreen display 210 may be used to create a pixel image of the contact area created by a touch event. The pixel image is defined by the pixel elements represented by the intersection of electrodes in the touch sensor layers/electrode layers. The pixel image may be used, for example, to determine a shape or profile of the contact area.

The centroid of the contact area is calculated by the controller 208 based on raw location and magnitude (e.g., capacitance) data obtained from the contact area. The centroid is defined in Cartesian coordinates by the value $(X_c, Y_c)$. The centroid of the contact area is the weighted averaged of the pixels in the contact area and represents the central coordinate of the contact area. By way of example, the centroid may be found using the following equations:

$$X_c = \frac{\sum_{i=1}^{n} Z_i * x_i}{\sum_{i=1}^{n} Z_i} \quad (1)$$

$$Y_c = \frac{\sum_{i=1}^{n} Z_i * y_i}{\sum_{i=1}^{n} Z_i} \quad (2)$$

where $X_c$ represents the x-coordinate of the centroid of the contact area, $Y_c$ represents the y-coordinate of the centroid of the contact area, x represents the x-coordinate of each pixel in the contact area, y represents the y-coordinate of each pixel in the contact area, Z represents the magnitude (capacitance value or resistance) at each pixel in the contact area, the index i represents the electrodes in the contact area and n represents the number of electrodes in the contact area. Other methods of calculating the centroid will be understood to persons skilled in the art.

The controller 208 of the touchscreen display 210 is typically connected using both interrupt and serial interface ports to the processor 240. In this way, when an interrupt signal which indicates a touch event has been detected, the centroid of the contact area, as well as raw data regarding the location and magnitude of the activated electrodes in the contact area, are passed to the processor 240. However, in other example embodiments only an interrupt signal which indicates a touch event has been detected and the centroid of the contact area are passed to the processor 240. In embodiments where the raw data is passed to the processor 240, the detection of a touch event (i.e., the application of an external force to the touch-sensitive input surface 206) and/or the determination of the centroid of the contact area may be performed by the processor 240 of the device 201 rather than the controller 208 of the touchscreen display 210.

In other embodiments, the touchscreen display 210 may be a display device, such as an LCD screen, having the touch-sensitive input surface (overlay) 206 integrated therein. One example of such a touchscreen is described in commonly owned U.S. patent publication no. 2004/0155991,published Aug. 12, 2004 (also identified as U.S. patent application Ser. No. 10/717,877,filed Nov. 20, 2003) which is incorporated herein by reference.

While a specific embodiment of the touchscreen display 210 has been described, any suitable type of touchscreen may be used in the handheld electronic device of the present disclosure including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the handheld electronic device and its particular application and demands.

Referring again to FIG. 2, the control buttons or keys 260 are located below the touchscreen display 210 on the front face 305 of the device 201 and generate corresponding input signals when activated. The control keys 260 may be constructed using any suitable key construction, for example, the controls keys 260 may each comprise a dome-switch. In other embodiments, the control keys 260 may be located elsewhere, such as on a side of the device 201. If no control keys are provided, the function of the control keys 260 described below may be provided by one or more virtual keys (not shown), which may be part of a virtual toolbar or virtual keyboard. In some embodiments, the input signals generated by activating (e.g. depressing) the control keys 260 are context-sensitive depending on the current/active operational mode of the device 201 or current/active application 225.

Although in the illustrated embodiments the case 304 is shown as a single unit it could, among other possible configurations, include two or more case members hinged together (such as a flip-phone configuration or a clam shell-style lap top computer, for example), or could be a "slider phone" in which the keyboard is located in a first body which is slideably connected to a second body which houses the display screen, the device being configured so that the first body which houses the keyboard can be slid out from the second body for use. In other embodiments, the mobile communication device 201 could have a mechanical keyboard in addition to the touchscreen display 210.

Generating DTMF Commands

Figure 6:
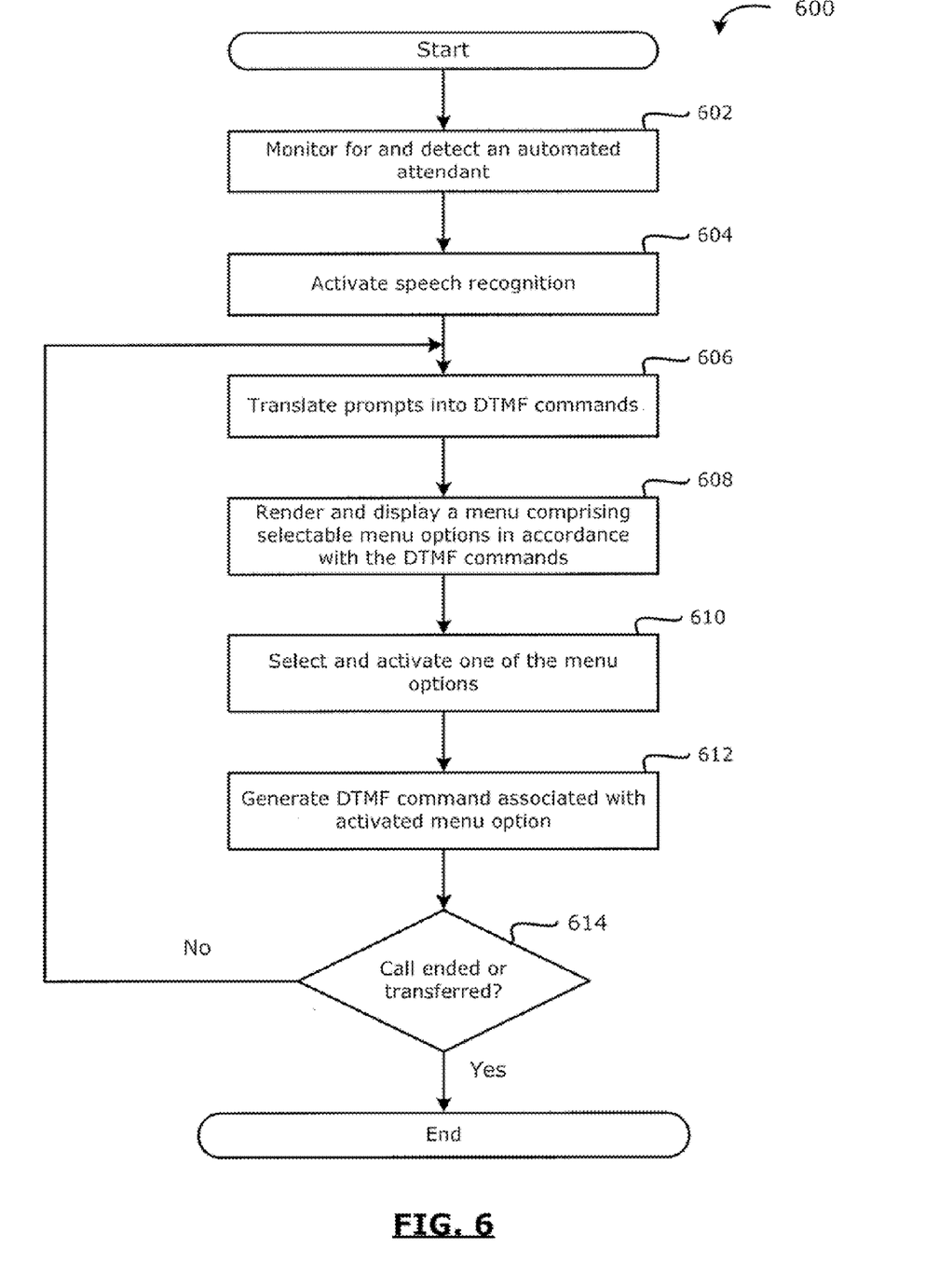
FIG. 6 is a flowchart illustrating example operations for generating dual-tone multi-frequency (DTMF) commands on a mobile communication device having a touchscreen in accordance with a first example embodiment of the present disclosure.

Reference is now made to FIG. 6 which illustrates example operations 600 for generating dual-tone multi-frequency commands on the device 201 in accordance with one example embodiment of the present disclosure. The operations 600 are carried out by the processor 240 (FIG. 1) of the mobile communication device 201 under the instruction of one or more of the software modules 221. The operations 600 are performed during a telephone call, typing during an outgoing call but possibly during an incoming call.

In the first step 602, the processor 240 monitors for and detects an automated attendant during the telephone call. Any suitable technique can be used to monitor for and detect an automated attendant. In some embodiments, one or more voice recognition algorithms could be used to differentiate between automated attendants and live voices of live speakers. For example, a standard answering machine detection algorithm could be used. Many different answering machine detection algorithms are known in the art. The answering machine detection algorithm could be embedded into the telephone application 282 which could automatically determine if an automated attendant is on the other side of the call. Example methods of detecting automated voices such as those of automated attendant systems and answering machines are described in U.S. Pat. No. 5,724,420 issued on Mar. 3, 1998 to Torgrim, and U.S. Pat. No. 6,418,211 issued on Jul. 9, 2002 to Irvin. The content of these documents is incorporated herein by reference.

Voice recognition algorithms, such as those described in the above-mentioned documents, detect predetermined voice parameters such as the rate of speech, voice energy (i.e., the amplitude of syllables) and empty space (i.e., the time between words). Operations employing voice recognition algorithms often perform phoneme analysis and/or frequency range analysis on the voice data, depending on the predetermined voice parameters which are detected.

In addition to, or instead of the predetermined voice parameters mentioned above, voice recognition algorithms may detect voice patterns indicative of a recorded message/recorded voice rather than a live voice. For example, outgoing calls answered with a live voice of a live speaker are normally answered with a short greeting such as a simple "hello" followed by empty space in which the live speaker who answered the call waits for a response from the caller. In contrast, automated attendants normally answer with a pre-recorded greeting message which typically comprises continuous speech for a predetermined period. The predetermined period of continuous speech could be, for example, 10 to 20 seconds in length. The automated attendant detector module 286 is configured to analyze incoming voice data from the opposite end of the call. In some embodiments, detecting an automated attendant system during the telephone call comprises monitoring for and detecting one or more predetermined voice parameters (e.g., rate of speech, voice energy and empty space) indicative of an automated attendant system and/or monitoring for and detecting/recognizing continuous speech or other voice patterns indicative of a recorded voice.

Next, in step 604 speech recognition in respect of the incoming voice data is activated in response to respective input such as detecting an automated attendant in step 602. In some embodiments, input to activate speech recognition is automatically generated by the automated attendant detector module 286 and sent to the processor 240 when an automated attendant is detected in step 602. In response to receiving this input, the processor 240 activates the speech recognition module 284. Incoming voice data received via the communication subsystem 211 is then routed by the processor 240 to: (i) the device speaker 256 for reproduction thereon or to an audio output port for reproduction on an external speaker (not shown) connected to the audio output port such as a pair of earphones, headphones or earbuds; and (ii) the speech recognition module 284 for conversion from speech in voice data into text and/or other input.

In other embodiments, the input to activate speech recognition could be predetermined input received via an input device of the device 201. The input is generated by the device user rather than being automatically generated in response to detecting an automated attendant. The input could be, for example, the input signal generated in response to depression of a predetermined control key 260 or the invocation of a menu of the GUI and the subsequent selection and activation of speech recognition as a menu option in the invokable menu. Step 602 may be omitted when it is the device user that determines that an automated attendant is at the opposite end of the call.

Next, in step 606 spoken prompts (also referred to as voice prompts) of the automated attendant requesting input selecting a menu option are identified in the incoming voice data by the speech recognition module 284 and translated into respective dual-tone multi-frequency (DTMF) signal/tone commands. As will be appreciated by persons skilled in the art, DTMF provides signaling in the voice-frequency band between telephones and other communications devices and is standardized by ITU-T Recommendation Q.23. In at least some embodiments, the speech recognition module 284 recognizes spoken prompts for inputs from a telephone keypad in accordance with the ITU standard (ITU E.161) as the prompts are spoken by the automated attendant and determines the respective DTMF signal/tone commands.

In some embodiments, spoken prompts requesting input selecting a menu option are identified in the incoming voice data by the speech recognition module 284 and translated into a menu structure comprising one or more menus, each menu having one or more menu options. The DTMF signal/tone commands associated with each menu option of each menu are also determined. As will be appreciated by persons skilled in the art, the menu structure of the automated attendant system may comprise a menu hierarchy of cascading or hierarchical menus. As the device user progresses through the menu hierarchy, the speech recognition module 284 may learn the menu hierarchy. The learned menu hierarchy can then be maintained in memory for the duration of the call or possibly longer depending on the embodiment or user preferences. For example, the speech recognition module 284 and/or user interface module 288 may provide an option to store the learned menu hierarchy in persistent memory such as the flash memory 244 for use in subsequent calls and/or uploading to a data store of automated attendant menu structures. When the learned menu hierarchy is maintained only for the duration of the call, it may be stored in volatile memory (e.g. in RAM 246) for the duration of the call.

In other embodiments, the speech recognition module 284 may not learn the menu hierarchy. Instead, speech recognition is performed by the speech recognition module 284 without storing and without regard to previous menus in a menu hierarchy, possibly without even storing and without regard to previous menu options in a particular menu. In such embodiments, speech recognition is performed by the speech recognition module 284 without regarding to previous menus or possibly even previous menu options as the user progresses/passes through the various menus and menu options.

Figure 5A:
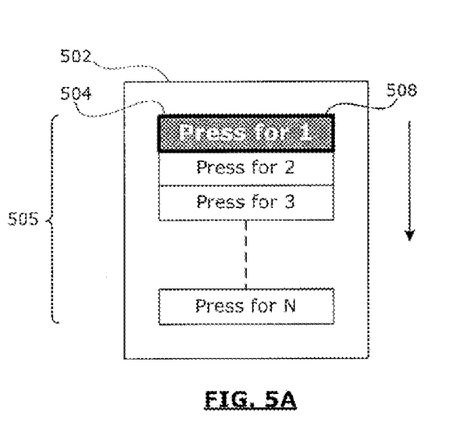
FIGS. 5A and 5B illustrate an example user interface screen for interacting with an automated attendant using a touchscreen display in accordance with one example embodiment of the present disclosure.
Figure 5B:
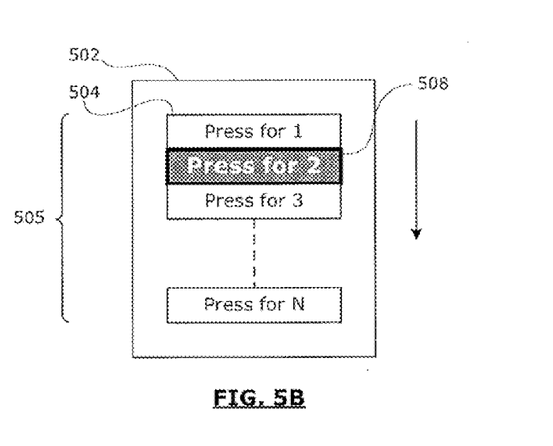

Next, in step 608 a menu comprising selectable menu options in accordance with the DTMF commands and possibly the spoken prompts is rendered by the UI module 288 and displayed in the GUI on the touchscreen display 210 of the device 201. FIGS. 5A and 5B illustrate an example user interface screen 502 having a menu 504 comprising selectable menu options 505. The menu 504 allows device users to listen to and/or view all menu options 505 before selecting and activating one of the menu options 505. This allows device users to make a more informed selection in respect of automated attendant menu structures which they are not familiar, decreasing erroneous selections and improving call efficiency for both users and automated attendants by reducing call times and possibly the number of calls (e.g., reducing or eliminating hang-ups and call-backs from frustrated users or users who cannot navigate back to an appropriate menu in the menu hierarchy of the automated attendant menu structure). The user interface screen 502 also allows users to interact with automated attendants using the touchscreen display 210 more effectively, as described more fully below.

The selectable menu options 505 of the menu 504 may be the same as the spoken prompts for the menu options of the automated attendant menu structure or derived therefrom. For example, the menu options 505 may comprise text obtained from converting the spoken prompts to text. The text may have been edited for grammar based on predetermined rules of grammar or edited for length to meet predetermined rules for length. The menu options 505 could include only a numeric menu option (e.g. "1"), a numeric menu option with an instruction (e.g. "Press 1"), or possibly a numeric menu option with an instruction and context or menu option result (e.g. "Press 1 for English"). In the shown example of FIGS. 5A and 5B, the menu options 505 include a numeric menu option with an instruction "Press for i" where i is the numeric menu option requested by the automated attendant.

When menu options are not available in the memory of the device 201, the menu options 505 of the menu 504 may each be rendered and displayed in real-time in response to speech recognition performed on the incoming voice data. From a GUI perspective, the menu options 505 may be populated within the menu 504 as each new menu option 505 is added by the speech recognition module 284. Menu options 505 may not be available in the memory of the device 201 during the first interaction with an automated attendant, during subsequent interactions with an automated attendant when menu information is not stored in persistent memory between calls or possibly between menus 504 within a given telephone call and/or between passes through the menu 504 within a given telephone call.

Next, in step 610 a menu option 505 is selected in response to respective input. In some embodiments, menu options 505 are automatically selected for a predetermined duration when the menu option 505 is initially added to the menu 504 in response to input from the speech recognition module 284, or when the prompt for the corresponding menu option of the automated attendant system is reproduced (i.e. played) on the device 201 during subsequent passes or playing of the menu by the automated attendant system after the menu 504 has been rendered and displayed. In such embodiments, the speech recognition module 284 generates inputs selecting the corresponding menu option 505 of the menu when the spoken prompt for the corresponding menu option is reproduced. The predetermined duration that each menu option 505 is automatically selected could be the duration of the recorded voice of the spoken prompt plus an optional buffer to accommodate empty space between spoken prompts.

Alternatively, a menu option 505 may be selected in response to respective input via an input device of the device 201 rather than input from the speech recognition module 284 automatically selecting menu options 505 as described above. For example, the user may select one of the displayed menu options 505 via corresponding input via the touchscreen display 210 or other input device of the mobile device 201. Automated selection and user selection may be permitted simultaneously in at least some embodiments.

Menu options 505 which have been selected are shown using a caret or navigation cursor 508 (sometimes referred to as the focus) within the menu 504 as shown in FIGS. 5A and 5B. In the shown example, selection of a menu option 505 with the navigation cursor 508 causes the respective menu option 505 to become highlighted. Highlighting comprises changing the colour of the background and the colour of the text of the respective menu option 505. In the shown embodiment, the colour of the background is changed from white to blue and the colour of the text is changed to from black to white. In other embodiments, only one of the background colour and text colour may be changed. In other embodiments, different colours may be used as the default background colour and text colour, and different colours may be used as the highlighted background colour and text colour.

In embodiments in which menu options 505 are automatically selected in response to input from the speech recognition module 284, the navigation cursor 508 is moved through the list of menu options 505 in the menu 504 in the downward direction of the user interface screen 502 when the corresponding spoken prompt/menu option is reproduced on the device 201 as indicated by the arrow. When the menu options 505 are initially added to the menu 504 in response to input from the speech recognition module 284, the navigation cursor 508 may be moved to a newly added menu option to select the newly added menu option.

In some embodiments, regardless of whether a menu option 505 is selected automatically or in response to user input, selected menu options 505 require activation input before any additional action will be performed by the processor 240. Activation input could be touch input in a predefined area of the touch-sensitive input surface 206 of the touchscreen display 210 (e.g. touching the display 210 at the location of a respective onscreen GUI element such as virtual button), or depression of the touchscreen display 210 and switch 261. When menu options 505 are automatically selected in response to input from the speech recognition module 284, touching the touchscreen display 210 or clicking the touchscreen display 210 and switch 261 will activate the corresponding menu option 505 and generate its respective DTMF command. Thus, when the device 201 is held against the device user's ear, clicking the touchscreen display 210 and switch 261 when the menu options is reproduced by the automated attendant could be used to activate the corresponding menu option 505 and generate its respective DTMF command.

The type of input required for activation of a selected menu option 505 may be selected by the user via respective input or by a sensor (not shown) as described below. In some embodiments, the operations 600 may include a step (not shown) of selecting a first input mode or second input mode for receiving input activating a selected menu option 505 in accordance with respective input. In the first input mode, the input activating a selected menu option 505 is touch input via the touch-sensitive input surface 206. In the second input mode, the input activating a selected menu option 505 is depression of the touchscreen display 210 and switch 261.

In some embodiments, the input selecting the first input mode or second input mode is provided by a sensor. The sensor is configured to detect when the mobile communication device is held adjacent to an ear of a device user. In some embodiments, the sensor could be a proximity sensor. In such embodiments, the processor 240 is configured to detect an object within a predetermined proximity of the touch-sensitive input surface 206 in accordance with a proximity measurement detected by the proximity sensor. In other embodiments, the sensor could be a light sensor. In such embodiments, the processor 240 is configured to detect an object located adjacent to the touch-sensitive input surface 206 in accordance with an amount of light detected by the light sensor.

In other embodiments, separate activation input may only be required when a menu option 505 is selected automatically. When a menu option 505 is selected in response to user input, selection input may be sufficient without separate activation input.

In some embodiments, the GUI may be locked in response to detection of the automated attendant and cannot be changed to switch to another application 225 or mode of the device 201. This ensures that inputs received via the touchscreen 210 during the call are properly processed and that the DTMF commands corresponding to selected menu options 505 are generated and sent to the automated attendant. The GUI may be locked for the duration of the call and unlocked in response to input, after the call ends, or after the call is transferred to a live person or otherwise disconnected from the automated attendant so that the automated attendant is no longer at the opposite end of the call.

Next, in step 612 a DTMF command is generated in accordance with the activated menu option 505 and sent to the automated attendant using the DTMF encoder 287. The operations 606 to 612 may be repeated for other menus in the automated attendant menu structure until the call ends, is transferred to a live person, or otherwise disconnected from the automated attendant (step 614). Voice recognition algorithms described above or respective user input may be used to determine when the call has been transferred to a live person. User input could also be used to exit the operations 600.

In some embodiments, the speech recognition module 284 or UI module 288 may determine the menu structure for the automated attendant system, in accordance with the DTMF commands. The determined menu structure may be wirelessly uploaded to a remote data store in association with one or more of a telephone number or name of the automated attendant system where it is stored by the data store. The menu structure of the automated attendant system can then be downloaded by the device 201 or other devices 201 in the future via a data connection to the data store using as identifying information one or more of a telephone number or name associated with the automated attendant system. The telephone number and/or name associated with automated attendant could be obtained from caller identification information when the telephone call is an incoming call, a personal address book of the device 201, a global address book of the network 124, or a third party telephone lookup data service.

Figure 7:
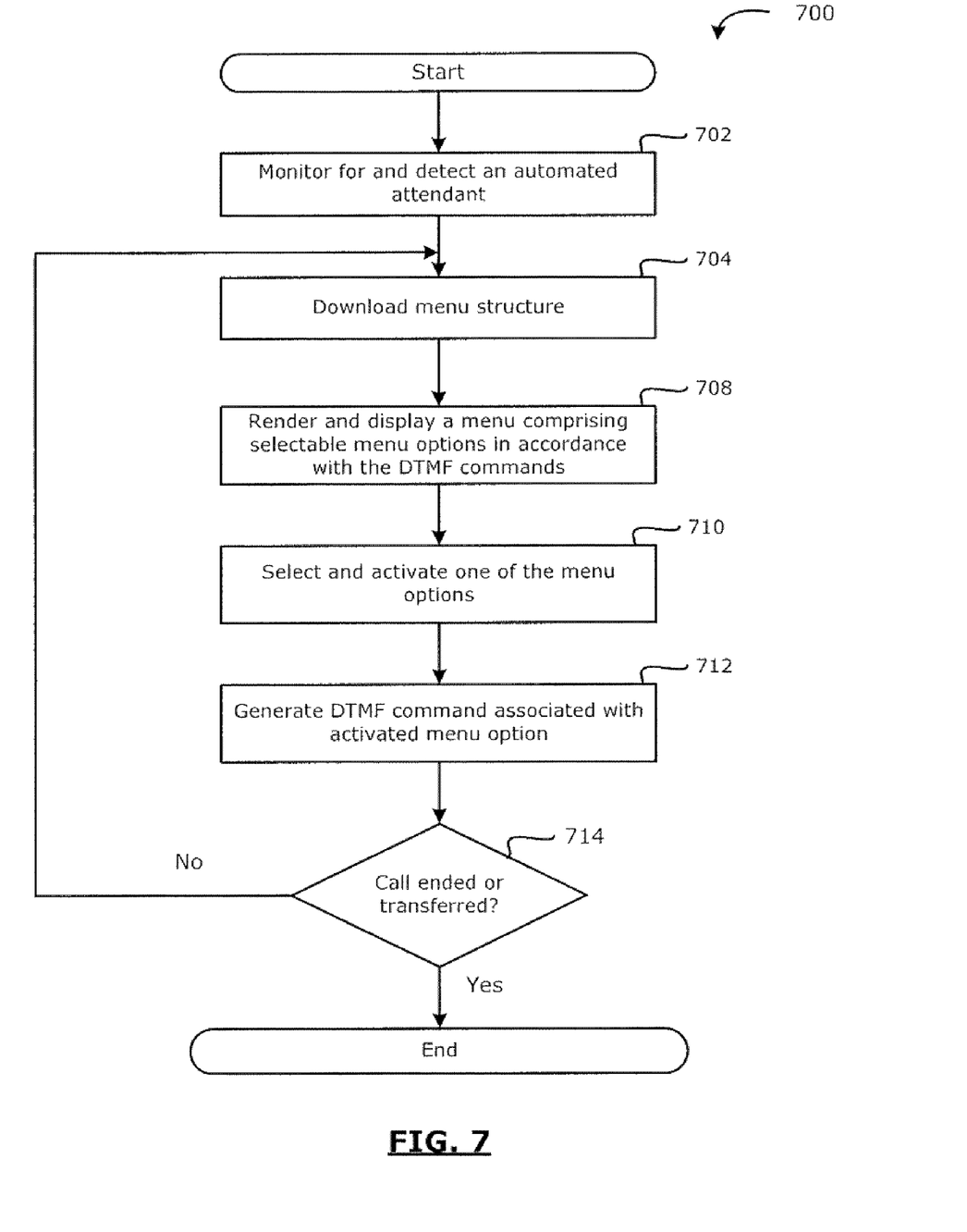
FIG. 7 is a flowchart illustrating example operations for generating dual-tone multi-frequency (DTMF) commands on a mobile communication device having a touchscreen in accordance with a second example embodiment of the present disclosure.

Reference is now made to FIG. 7 which illustrates example operations 700 for generating dual-tone multi-frequency commands on the device 201 in accordance with another example embodiment of the present disclosure. The operations 700 are similar to the operations 600 described above, and are carried out by the processor 240 (FIG. 1) of the mobile communication device 201 under the instruction of one or more of the software modules 221. In the operations 700, the menu structure of the automated attendant system is downloaded via a separate data connection to the automated attendant system or separate data store where automated attendant menu structures are stored. Advantageously, this allows the menus for automated attendants to be rendered without translating incoming voice data using speech recognition, thereby saving processing resources which would otherwise be required.

In the first step 702, the processor 240 monitors for and detects an automated attendant during the telephone call as described above in connection with the operations 600 of FIG. 6. Alternatively, user input via the touchscreen 210, control keys 260, or other input device may be used to determine that an automated attendant has been encountered during the telephone call.

Next, in step 704 the device 201 downloads the menu structure from the automated attendant system or separate data store. This step comprises the processor 240 requesting and receiving the menu structure from the automated attendant system or separate data store. The automated attendant menu structure can be identified in the request to the data store, which may be managed by a content server, using the telephone number and/or name associated with the automated attendant system at the opposite end of the call. The telephone number and/or name associated with the automated attendant could be obtained using one or more of the approaches described above such as using caller identification information when the telephone call is an incoming call. The DTMF signal/tone commands in respect of various menus of the automated attendant system and optionally other information are received as part of the menu structures. The menu structure is then stored in volatile memory such as RAM 246 when the menu structure is to be maintained only for the duration of the present telephone call, or in persistent memory such as the flash memory 244 for use in subsequent calls depending on the embodiment or user preferences.

Next, in steps 708 to 712, a menu 504 comprising menu options 505 is rendered and displayed on the touchscreen display 210, a menu option 505 in the menu 504 is selected and activated, and a corresponding DTMF command is generated as described above in steps 608 to 612 in connection with the operations 600 of FIG. 6. The operations 708 to 712 may be repeated for other menus in the automated attendant menu structure until the call ends, is transferred to a live person, or otherwise disconnected from the automated attendant (step 714). Voice recognition algorithms described above or respective user input may be used to determine when the call has been transferred to a live person. User input could also be used to exit the operations 600.

In yet another embodiment, the GUI aspects of the operations 600 and 700 may be omitted. Instead, the speech recognition module 284 determines the DTMF commands associated with menu options reproduced/announced by the automated attendant system without rendering or displaying a menu 504 on the touchscreen display 210. In such embodiments, touch input anywhere on the touch-sensitive input surface 206 or depression of the touchscreen 210 and switch 261 causes the DTMF command of the spoken prompt/menu option currently being reproduced by the automated attendant to be generated.

In an example use case, the speech recognition module 284 recognizes the numbers of the menu options reproduced by the automated attendant, and configures the touchscreen display 210 to generate the respective DTMF signal/tone command associated with that number when the touchscreen display 210 is touched anywhere or is clicked while the spoken prompt/menu option is reproduced by the automated attendant. The type of input required for selecting a menu option 505 may be fixed, determined by user preferences, selected by the user via respective input or selected by a sensor as described above depending on the embodiment. In this example use case, it is not necessary for device user to view the touchscreen display 210 to select a menu option. Depending on the type of input required for selecting a menu option 505, pressing the device 201 against the device user's ear may be sufficient to make the selection as this will depress the switch 261. For example, when the menu options of the automated attendant menu structure are "Press 1 for English" and "Press 2 for French", clicking the touchscreen display 210 when the spoken prompt/menu option "Press 1 for English" is played/reproduced may select that menu option and generate the respective DTMF command in some embodiments. Alternatively, touch input anywhere on the touchscreen display 210 when the spoken prompt/menu option "Press 1 for English" is played/reproduced will select that menu option and generate the respective DTMF command in other embodiments.

While the operations 600 and 700 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

Communication System

Figure 8:
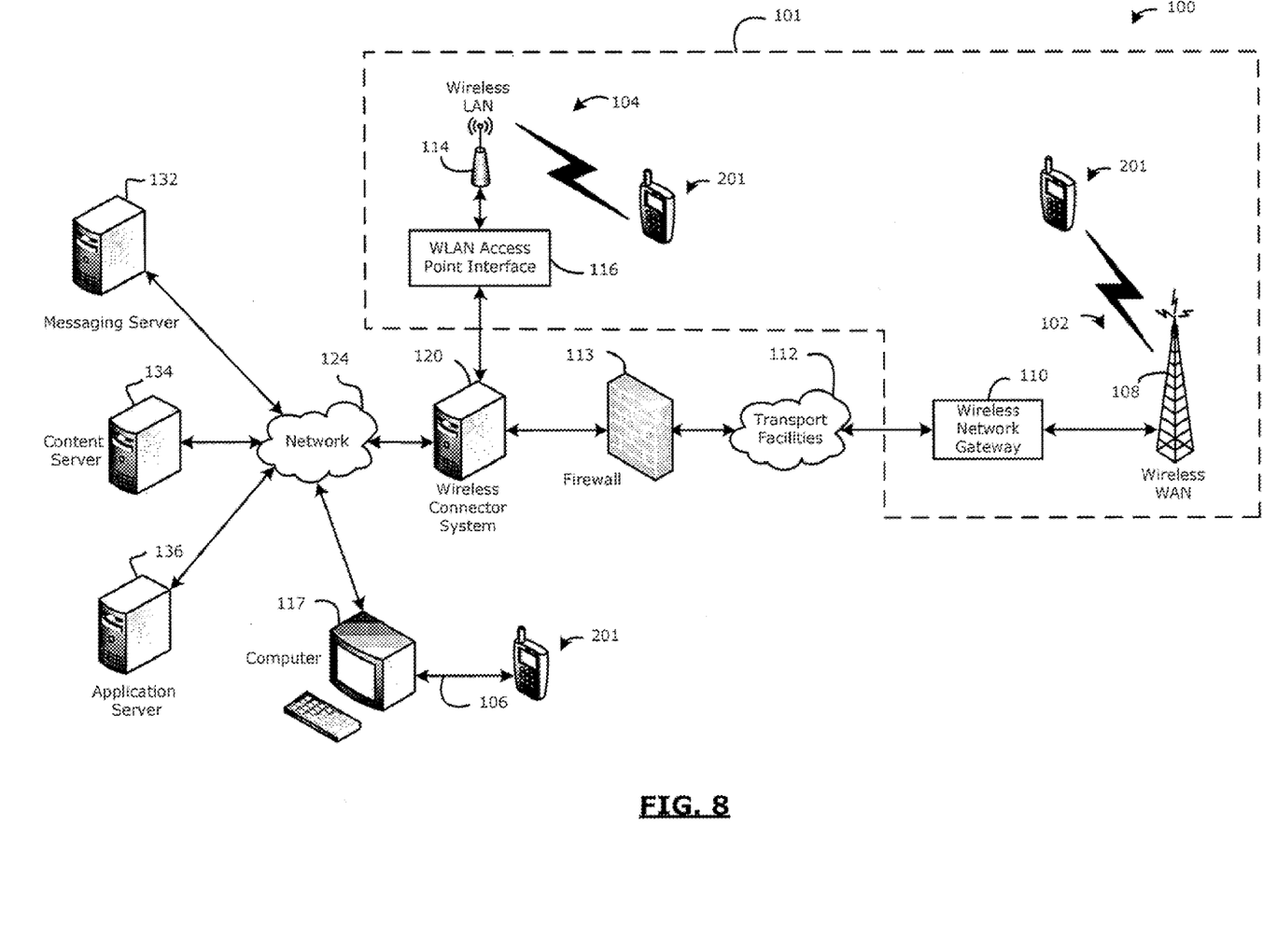
FIG. 8 is a block diagram illustrating a communication system including a mobile communication device to which example embodiments of the present disclosure can be applied.

In order to facilitate an understanding of one possible environment in which example embodiments described herein can operate, reference is made to FIG. 8 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 8 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000,EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANS.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown In FIG. 8) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line of FIG. 8 via the transport facilities 112 if the access point 114 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated In a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

While the present disclosure is primarily described in terms of methods, a person of ordinary skill in the art will understand that the present disclosure is also directed to various apparatus such as handheld mobile communication devices including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a RAM, a ROM, an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for generating dual-tone multi-frequency (DTMF) commands on a mobile communication device having a touchscreen, comprising:
   detecting an automated attendant during a telephone call;
   activating speech recognition in respect of incoming voice data during the telephone call in response to detecting an automated attendant;
   translating spoken prompts in the incoming voice data into respective DTMF commands;
   displaying a menu having selectable menu options corresponding to the DTMF commands in a graphical user interface on the touchscreen;
   receiving input selecting one of the menu options, the menu options being automatically selected for a predetermined duration when the corresponding spoken prompts are reproduced by the automated attendant;
   receiving input via the touchscreen activating a selected one of the menu options; and
   generating a DTMF command in accordance with the activated menu option.

2. The method of claim 1, wherein detecting an automated attendant is performed using voice recognition, and wherein speech recognition in respect of the incoming voice data is automatically activated in response to detecting an automated attendant.

3. The method of claim 1, wherein detecting an automated attendant is performed by the device user, and wherein speech recognition in respect of the incoming voice data is activated in response to predetermined input received via an input device of the mobile communication device.

4. The method of claim 1, further comprising:
   determining a menu structure for the automated attendant in accordance with the DTMF commands; and
   wirelessly uploading the menu structure to a remote data store in association with one or more of a telephone number or name of the automated attendant.

5. The method of claim 1, further comprising:
   determining a menu structure for the automated attendant in accordance with the DTMF commands; and
   storing the menu structure in a memory of the mobile communication device.

6. The method of claim 5, further comprising:
   after detecting an automated attendant during a subsequent telephone call and before activating speech recognition, determining whether a menu structure for the automated attendant is stored in the memory of the mobile communication device;
   wherein activating speech recognition and translating spoken prompts are performed when the menu structure for the automated attendant is not stored in the memory of the mobile communication device; and
   wherein the displayed menu is based on a stored menu structure when the menu structure for the automated attendant is stored in the memory of the mobile communication device.

7. The method of claim 1, wherein the input activating a selected one of the menu options is depression of the touchscreen.

8. The method of claim 1, wherein the touchscreen is a depressible touchscreen and has a touch-sensitive input surface, the method further comprising:
   selecting a first input mode or second input mode for receiving input activating a selected one of the menu options in accordance with respective input, wherein in the first input mode the input activating a selected one of the menu options is touch input via the touch-sensitive input surface, and wherein in the second input mode the input activating a selected one of the menu options is depression of the touchscreen.

9. The method of claim 8, wherein the input selecting the first input mode or second input mode is provided by a sensor configured to detect when the mobile communication device is held adjacent to an ear of a device user.

10. The method of claim 9, wherein the sensor is a proximity sensor, wherein the mobile communication device is configured to detect an object within a predetermined proximity of the touch-sensitive input surface in accordance with a proximity measurement detected by the proximity sensor.

11. The method of claim 9, wherein the sensor is a light sensor, wherein the mobile communication device is configured to detect an object located adjacent to the touch-sensitive input surface in accordance with an amount of light detected by the light sensor.

12. A method for generating dual-tone multi-frequency (DTMF) commands on a mobile communication device having a touchscreen, comprising:
   detecting an automated attendant during a telephone call;
   requesting and receiving DTMF commands in respect of the automated attendant in response to detecting an automated attendant;
   displaying a menu having selectable menu options corresponding to the DTMF commands in a graphical user interface on the touchscreen;
   receiving input selecting one of the menu options, the menu options being automatically selected for a predetermined duration when the corresponding spoken prompts are reproduced by the automated attendant;
   receiving input via the touchscreen activating a selected one of the menu options; and
   generating a DTMF command in accordance with the activated menu option.

13. A method for generating dual-tone multi-frequency (DTMF) commands on a mobile communication device having a touchscreen, comprising:
   detecting an automated attendant during a telephone call;
   activating speech recognition in respect of incoming voice data during a telephone call in response to detecting an automated attendant;
   translating spoken prompts in the incoming voice data into respective DTMF commands;
   receiving input via the touchscreen during reproduction of one of the spoken prompts; and
   generating a DTMF command in accordance with a spoken prompt being reproduced when the input is received via the touchscreen.

14. A handheld mobile communication device, comprising:
   a case housing the components of the device;
   a controller;
   an audio output device connected to the controller comprising one or more of a speaker or an audio output port;
   a wireless communication subsystem connected to the controller configured for at least voice communication with a wireless network;

a touchscreen display having a touch-sensitive input surface connected to the controller;

wherein the controller is configured for: detecting an automated attendant during a telephone call; activating speech recognition in respect of incoming voice data during a telephone call in response to detecting an automated attendant; translating spoken prompts in the incoming voice data into respective DTMF commands; displaying a menu having selectable menu options corresponding to the DTMF commands in a graphical user interface on the touchscreen; receiving input selecting one of the menu options; receiving input via the touchscreen activating a selected one of the menu options, the menu options being automatically selected for a predetermined duration when the corresponding spoken prompts are reproduced by the automated attendant; and generating a DTMF command in accordance with the activated menu option.

15. The device of claim 14, wherein the controller is configured for detecting an automated attendant using voice recognition, and wherein speech recognition in respect of the incoming voice data is automatically activated in response to detecting an automated attendant.

16. The device of claim 14, wherein the controller is further configured for: determining a menu structure for the automated attendant in accordance with the DTMF commands; and wirelessly uploading the menu structure to a remote data source in association with one or more of a telephone number or name of the automated attendant.

17. The device of claim 14, wherein the controller is further configured for: determining a menu structure for the automated attendant in accordance with the DTMF commands; and storing the menu structure in a memory of the mobile communication device.

18. The device of claim 17, wherein the controller is further configured for: after detecting an automated attendant during a subsequent telephone call and before activating speech recognition, determining whether a menu structure for the automated attendant is stored in the memory of the mobile communication device;

wherein activating speech recognition and translating spoken prompts are performed when the menu structure for the automated attendant is not stored in the memory of the mobile communication device; and wherein the displayed menu is based on a stored menu structure when the menu structure for the automated attendant is stored in the memory of the mobile communication device.

19. The device of claim 14, wherein the touchscreen is a depressible touchscreen, and wherein the input selecting one of the selectable menu options is depression of the touchscreen.

20. The device of claim 14, further comprising: a depressible switch disposed between a rear surface of the touchscreen display opposite the touch-sensitive input surface and the case; and wherein the controller is further configured to select a first input mode or second input mode for receiving input selecting one of the selectable menu options in accordance with respective input, wherein in the first input mode the input selecting one of the selectable menu options is touch input via the touch-sensitive input surface, and wherein in the second input mode the input selecting one of the selectable menu options is depression of the touchscreen.

21. The device of claim 20, wherein the input selecting the first input mode or second input mode is provided by a sensor configured to detect when the mobile communication device is held adjacent to an ear of a device user.

22. The method of claim 21, wherein the sensor is a proximity sensor, wherein the controller is configured to detect an object within a predetermined proximity of the touch-sensitive input surface in accordance with a proximity measurement detected by the proximity sensor.

23. The method of claim 21, wherein the sensor is a light sensor, wherein the controller is configured to detect an object located adjacent to the touch-sensitive input surface in accordance with an amount of light detected by the light sensor.

\* \* \* \* \*